United States Patent
Kitamura et al.

(10) Patent No.: US 10,429,900 B1
(45) Date of Patent: Oct. 1, 2019

(54) COUPLED STRUCTURE AND ELECTRONIC DEVICE

(71) Applicant: LENOVO (SINGAPORE) PTE. LTD., Singapore (SG)

(72) Inventors: Masahiro Kitamura, Yokohama (JP); Mitsuo Horiuchi, Yokohama (JP); Satoshi Douzono, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/022,674

(22) Filed: Jun. 28, 2018

(51) Int. Cl.
*G06F 1/16* (2006.01)
*G06F 3/02* (2006.01)

(52) U.S. Cl.
CPC .......... *G06F 1/1662* (2013.01); *G06F 3/0213* (2013.01); *G06F 3/0221* (2013.01); *G06F 1/1616* (2013.01)

(58) Field of Classification Search
CPC .................................................. G06F 1/1662
USPC ..................................................... 361/679.17
See application file for complete search history.

(56) References Cited

U.S. PATENT DOCUMENTS

| | | | | |
|---|---|---|---|---|
| 5,153,589 A * | 10/1992 | Heys, Jr. | ................ | B41J 29/387 341/22 |
| 5,490,036 A * | 2/1996 | Lin | ....................... | G06F 1/1616 361/679.11 |
| 5,510,953 A * | 4/1996 | Merkel | ................ | G06F 1/1616 200/5 A |
| 5,535,091 A * | 7/1996 | Lee | ....................... | H01H 13/702 248/220.21 |
| 5,546,334 A * | 8/1996 | Hsieh | .................... | G06F 1/1616 345/167 |
| 5,608,603 A * | 3/1997 | Su | ........................ | G06F 3/0202 200/303 |
| 5,642,257 A * | 6/1997 | Saito | .................... | G06F 1/1616 361/679.17 |
| 5,966,284 A * | 10/1999 | Youn | ..................... | G06F 1/1616 361/679.17 |
| 6,212,066 B1 * | 4/2001 | Fetterman | ............ | G06F 1/1616 248/917 |
| 6,320,743 B1 * | 11/2001 | Jin | ....................... | G06F 1/1616 361/679.08 |
| 6,510,048 B2 * | 1/2003 | Rubenson | ............ | G06F 1/1616 361/679.09 |
| 6,729,783 B2 * | 5/2004 | Godsted | ................ | G06F 1/1616 341/22 |

(Continued)

FOREIGN PATENT DOCUMENTS

JP 11265251 A 9/1999

*Primary Examiner* — Adrian S Wilson
(74) *Attorney, Agent, or Firm* — Shimokaji IP (57) ABSTRACT

A coupled structure capable of keeping the coupled state between coupled members without degrading the appearance, and an electronic device including such a coupled structure are disclosed. A coupled structure includes a keyboard unit coupled with a main body chassis. The coupled structure includes a hook mechanism which engages the keyboard unit with the main body chassis when the keyboard unit moves in one direction relative to the main body chassis, a locking part formed at the main body chassis, and an elastic part formed at the keyboard unit, and the elastic part biases the keyboard unit engaged with main body chassis in the one direction relative to the main body chassis when the locking part locks the elastic part.

10 Claims, 10 Drawing Sheets

(56) References Cited

U.S. PATENT DOCUMENTS

| | | | | |
|---|---|---|---|---|
| 8,050,020 B2 * | 11/2011 | Liu | .................. | G06F 1/1613 |
| | | | | 361/679.09 |
| 8,132,975 B2 * | 3/2012 | Tracy | .................. | G06F 1/1616 |
| | | | | 400/472 |
| 8,279,590 B2 * | 10/2012 | Kito | .................. | G06F 1/1616 |
| | | | | 345/168 |
| 10,353,437 B1 * | 7/2019 | Kitamura | .............. | G06F 1/1669 |
| 2008/0285216 A1 * | 11/2008 | Kobayashi | ............ | G06F 1/1616 |
| | | | | 361/679.08 |
| 2010/0247213 A1 * | 9/2010 | Stewart | ................ | G06F 1/1662 |
| | | | | 400/489 |
| 2016/0139637 A1 * | 5/2016 | Doi | .................. | G06F 1/1679 |
| | | | | 361/679.4 |
| 2018/0096804 A1 * | 4/2018 | Kitamura | ............. | G06F 1/1684 |

* cited by examiner

FIG. 9B ural, and a display chassis coupled with the main body chassis rotatably via a hinge. The main body chassis has the first member as the keyboard unit and the second member as a chassis component making up the main body chassis.

COUPLED STRUCTURE AND ELECTRONIC DEVICE

TECHNICAL FIELD

The present invention relates to a coupled structure including two coupled members and an electronic device including such a coupled structure.

BACKGROUND

An electronic device, such as a laptop personal computer (laptop PC), typically includes a keyboard unit attached to an upper face of the chassis (hereinafter called a main body chassis) of its main body. Patent Document 1, for example, discloses the structure having a recess at the upper face of the main body chassis so as to store a keyboard unit in this recess. This keyboard unit has a hook protruding from its lower face, and the keyboard unit is fixed to the main body chassis by engaging the hook with an engagement hole at the bottom face of the recess.

[Patent Document 1] Japanese Patent Application Laid-Open No. 11-265251

SUMMARY OF THE INVENTION

Such a structure as in Patent Document 1, for coupling a keyboard unit with a main body chassis via a hook mechanism, however, may cause displacement of the keyboard unit during the manufacturing or operation of the electronic device. This may lead to disengagement of the hook, and further may lead to deterioration of its appearance because the keyboard unit has a gap between its edge and the inner wall of the recess of the main body chassis. To avoid these problems, Patent Document 1 is configured to, after engaging with the hook, fill a gap between the keyboard unit and the recess with a lock member. This requires the cost for the lock member and degrades the appearance of the electronic device because such a lock member is disposed at only one of the edges of the keyboard unit.

In view of the problems of the conventional techniques, the present invention aims to provide a coupled structure capable of keeping the coupled state between the coupled members without degrading the appearance, and an electronic device including such a coupled structure.

A coupled structure according to the first aspect of the present invention includes a first member coupled with a second member. The coupled structure includes a hook mechanism which engages the first member with the second member when the first member moves in one direction relative to the second member; a locking part at the second member; and an elastic part at the first member, the elastic part biasing the first member engaged with the second member in the one direction relative to the second member when the locking part locks the elastic part.

With this configuration, the locking part locks the elastic part, and so the first member always receives a biasing force in the engagement direction (the one direction) of the hook mechanism. This can prevent the displacement of the first member relative to the second member during the manufacturing and operation, and so prevent the canceling of the engagement state of the hook mechanism, and the first and second members can keep their coupled state. Additionally, the first member is always biased in the one direction relative to the second member, and so a minimum gap is defined at the end toward the other direction, the gap corresponding to the engagement length of the hook mechanism. This gap does not change over time, and a gap at the end toward the one direction can be kept at substantially zero. This coupled structure therefore can suppress the deterioration in appearance as low as possible.

The hook mechanism may include an engagement hole at one face of the first member and a hook at one face of the second member or a hook at the one face of the first member and an engagement hole at the one face of the second member. After placing the one face of the first member on the one face of the second member and inserting the hook into the engagement hole, and moving the first member in the one direction relative to the second member, the hook engages with the engagement hole. The elastic member may be disposed at the one face of the first member, and the locking part may be disposed at the one face of the second member, and have a locking face directed to the one direction to lock the elastic part. This means that, since the locking face of the locking part locks the elastic part, a biasing force to the first member from the elastic part can be generated reliably.

The locking face may have an inclined face that is inclined gradually in the one direction and toward a direction of placing the one face of the first member on the one face of the second member. Therefore, when the user engages the hook mechanism and concurrently presses the first member against the second member, such an operation allows the elastic part to be deformed elastically and locked at the locking face of the locking part without a gap. This can prevent a gap between the elastic part and the locking part, and can generate a biasing force from the elastic part to the first member more reliably.

The coupled structure may include a screw that fastens the first member to the second member in the direction of placing the one face of the first member on the one face of the second member. This can make the coupling state between the first member and the second member more stable due to the fastening action by the screw in addition to the engagement action of the hook mechanism. The screw is fastened in the direction of placing the one face of the first member on the one face of the second member. This means that the fastening of the screw enables deeper engagement of the elastic part with the locking face of the locking part, and so can generate a biasing force from the elastic part to the first member more reliably.

The one face of the first member may have a recess having a first hole at a center, the first hole being for insertion of the screw, and the one face of the second member may have a second hole at a center, the second hole being for insertion of the screw, and have a projection that can fit to the recess of the first member. This configuration can prevent the displacement of the first member with the second member due to the fitting of the recess and the projection even when the screw is loosened due to a change over time or impact, for example.

The locking part may extend in the one direction and have an upper face continuous to the locking face, and the upper face of the locking part may have a length in the one direction that is longer than an engagement length of the hook with the engagement hole. This prevents the elastic part from being mounted on the upper face of the locking part before the engagement by the hook mechanism and getting caught at the end toward the other direction during the coupling of the first member with the second member, so that the first member cannot slide in the engagement direction.

An electronic device according to the second aspect of the present invention includes the above-stated coupled structure. The first member is a keyboard unit, and the second member is a chassis having an upper face on which the keyboard unit is mounted. With this configuration, the keyboard unit can be easily and reliably coupled with the upper face of the chassis of the electronic device, and their coupling state can be kept.

Preferably the one direction is a direction toward an end of the keyboard unit closer to a user of the electronic device. A biasing force from the elastic part then can reduce the gap between the end of the keyboard unit closer to the user and the chassis, and so the appearance of the electronic device can be improved.

The elastic part may be disposed at a position close to the end of the keyboard unit closer to the user. This can prevent lowering or loss of the biasing force from the elastic part because of a dimensional tolerance and elongation of the keyboard unit. This can reduce the gap between the end of the keyboard unit closer to the user and the chassis more reliably.

The keyboard unit may include a metal base plate and a resin housing plate stacked on an upper face of the base plate, the elastic part may include a first plate spring disposed at the base plate and a second plate spring disposed at the housing plate, the second plate spring being overlapped on the first plate spring, and the second plate spring may come in contact with the locking part. Such a metal first plate spring can improve the elasticity and the strength of the elastic part. Additionally, the resin second plate spring comes in contact with the locking part. This can suppress breakage or wearing of the locking part, which would occur if the locking part collides with the metal first plate spring, and can reduce impact noise generated at the contacting part between the elastic part and the locking part.

The above-described aspects of the present invention can keep the coupled state between the coupled members without degrading the appearance.

BRIEF DESCRIPTION OF THE DRAWINGS

FIG. 9A is a schematic plan view to describe a method to use a tool-receiving piece, a tool-receiving base and a tool-locking base to remove the keyboard unit from the main body chassis; and.

DETAILED DESCRIPTION OF THE INVENTION

Referring to the attached drawings, the following describes a coupled structure according to the present invention in details, by way of a preferable embodiment of an electronic device including such a coupled structure.

Figure 1:
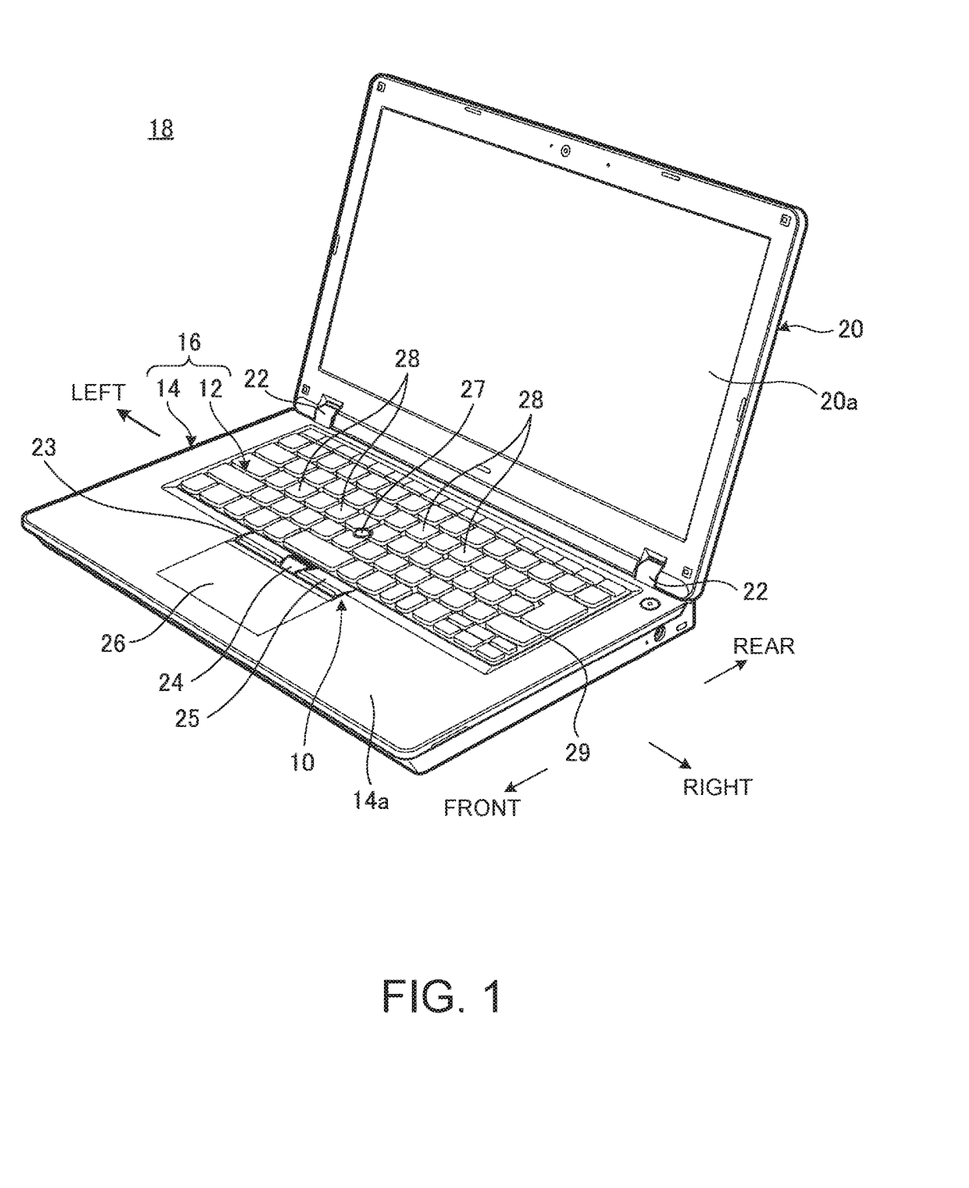
FIG. 1 is a perspective view of an electronic device including a coupled structure according to one embodiment of the present invention, and the coupled structure includes a keyboard unit coupled with a main body chassis via a coupling structure.

FIG. 1 is a perspective view of an electronic device 18 including a coupled structure 16 according to one embodiment of the present invention. This coupled structure includes a keyboard unit 12 coupled with a main body chassis 14 via a coupling structure 10. In the following description of the coupled structure 16, referring to the keyboard unit mounted on the electronic device 18 for use shown in FIG. 1, the forward and the back are called front and rear, respectively, the thickness direction is called vertically (up and down), and the width direction is called left and right.

As shown in FIG. 1, the electronic device 18 is a laptop PC, including the main body chassis 14 having the keyboard unit 12 and a display chassis 20 having a display unit 20a, such as a liquid crystal display. The display chassis 20 openably/closably couples with the main body chassis 14 via a pair of left and right hinges 22, 22.

The main body chassis 14 internally stores various electronic components, such as a board, an arithmetic unit, a hard disk device and a memory, which are not illustrated. On the upper face 14a of the main body chassis 14, the keyboard unit 12, push buttons 23, 24, 25 and a touchpad 26 are disposed in this order from the rear to the front. The keyboard unit 12 has a pointing stick 27 at its substantially center part.

The keyboard unit 12 is an isolation type having a plurality of keys 28 that are isolated with a frame 29 surrounding the keys 28. That is, the frame 29 has a plurality of holes, into which keytops of the keys 28 are inserted to be movable vertically. The touchpad 26 and the pointing stick 27 are to control a cursor (mouse point) displayed on the display unit 20a, and are alternative input means to a mouse. The push buttons 23 to 25 link with the touch pad 26 or the pointing stick 27 to control the cursor. For instance, the push buttons 23 to 25 correspond to a left button, a center button and a right button, respectively, of a typical mouse.

Figure 2A:
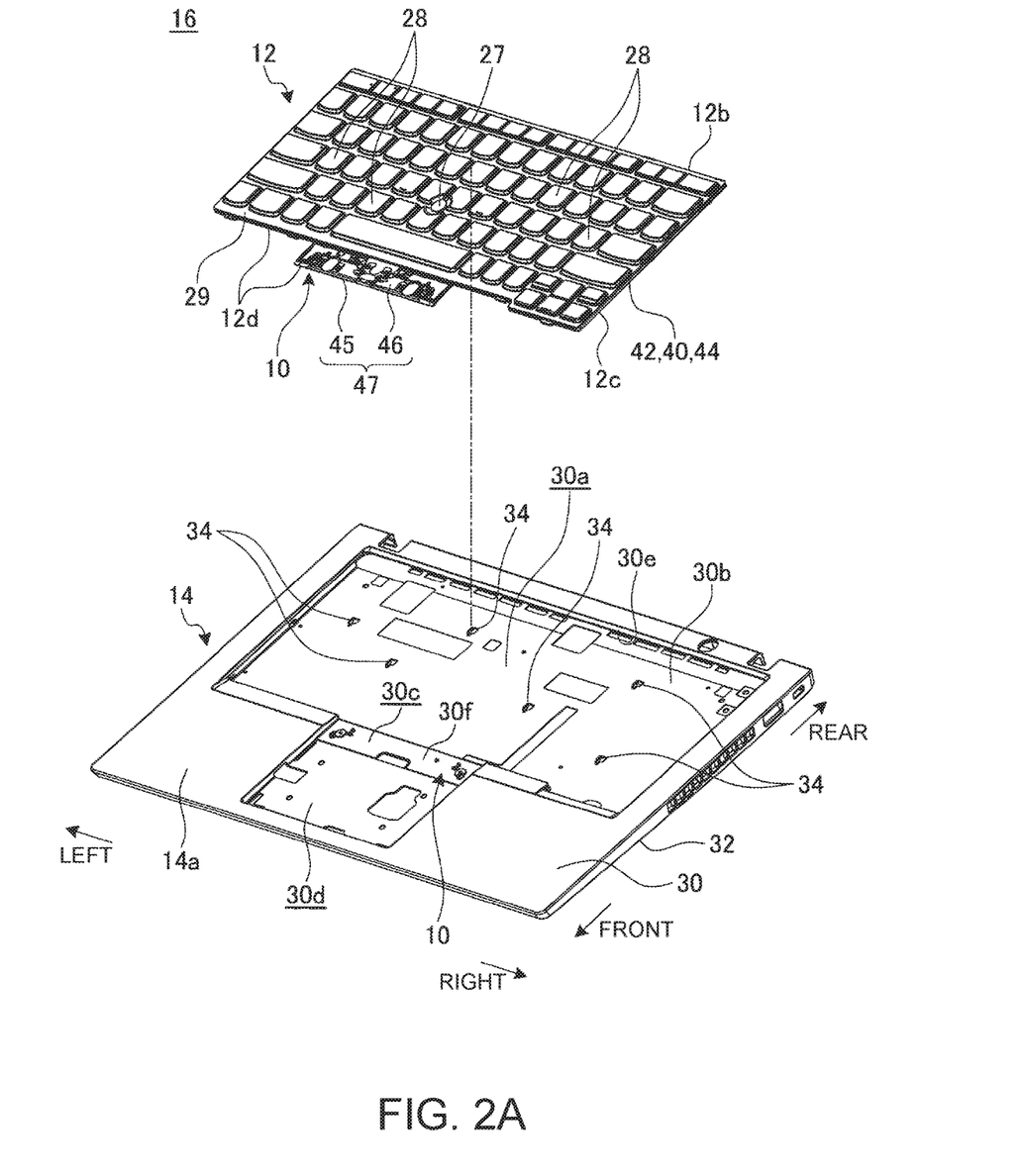
FIG. 2A is an exploded perspective view showing the attachment of the keyboard unit to the main body chassis via the coupling structure.
Figure 2B:
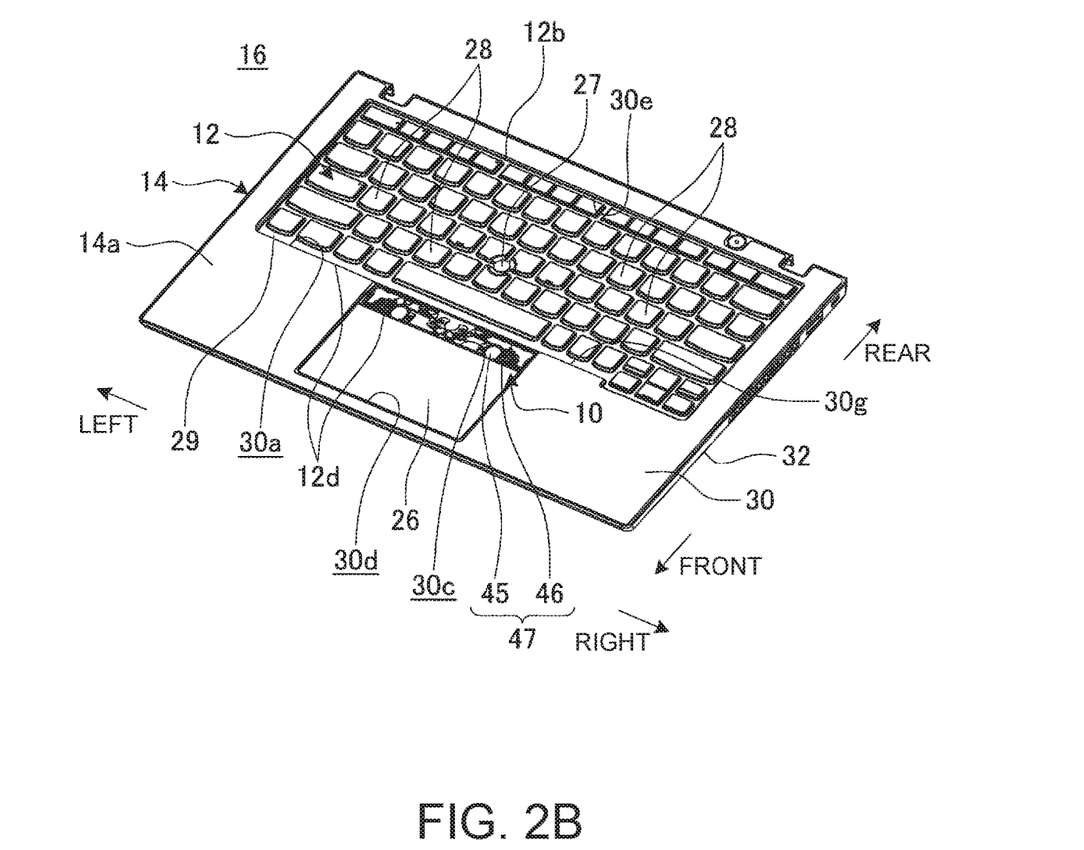
FIG. 2B is a perspective view showing the keyboard unit attached to the main body chassis via the coupling structure.

Next, the following describes the coupling structure 10 of the keyboard unit 12 with the main body chassis 14 as well as the coupled structure 16. FIG. 2A is an exploded perspective view showing the attachment of the keyboard unit 12 to the main body chassis 14 via the coupling structure 10. FIG. 2B is a perspective view showing the keyboard unit 12 attached to the main body chassis 14 via the coupling structure 10.

As shown in FIGS. 2A and 2B, the main body chassis 14 has a thin box shape including an upper cover 30 and a lower cover 32. The upper cover 30 has a storage recess 30a for storage of the keyboard unit at the upper face 14a, and the recess has a shallow bathtub-like shape corresponding to the outer shape of the keyboard unit 12. The storage recess 30a has a plurality of hooks 34 at appropriate positions of the bottom face (one face, upper face) 30b, and the hooks protrude from the bottom face. At a center part in front of the storage recess 30a, the upper cover has a button storage recess 30c and a pad storage recess 30d. The button storage recess 30c is the place to attach the push buttons 23 to 25, and the pad storage recess 30d is the place to attach the touch pad 26.

The keyboard unit 12 has a top-mount structure, i.e., the keyboard unit is mounted on the storage recess 30a by placing it from the above. For the attachment, a part or all of the hooks 34 protruding from the bottom face 30b are allowed to engage with engagement holes 36 (see FIGS. 3A and 3B) at the lower face of the frame 29 of the keyboard unit 12, whereby the keyboard unit 12 can be attached to the main body chassis 14.

Figure 3A:
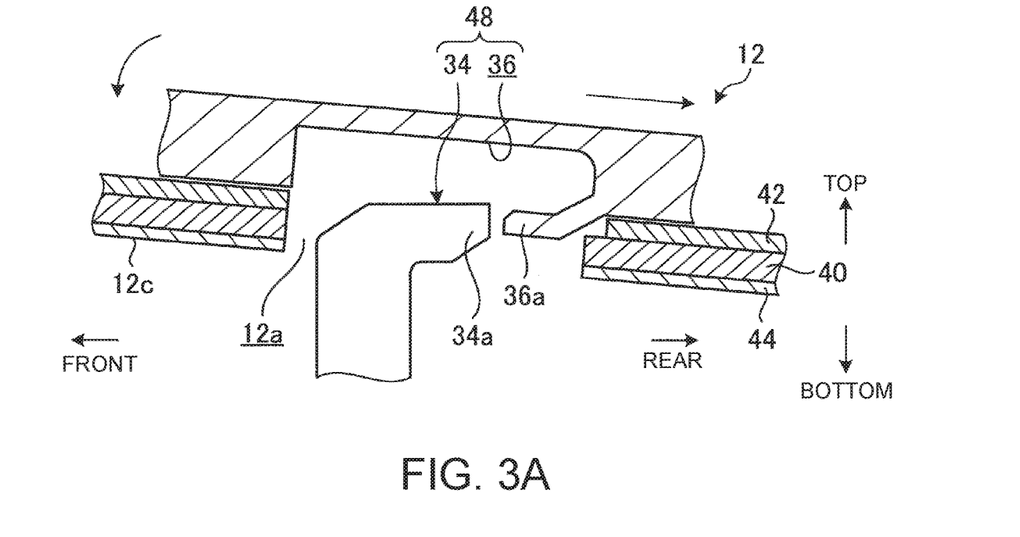
FIG. 3A is a cross-sectional view, schematically showing the cross-sectional structure of one of the engagement holes and its surroundings just before attachment of the keyboard unit to the main body chassis.
Figure 3B:
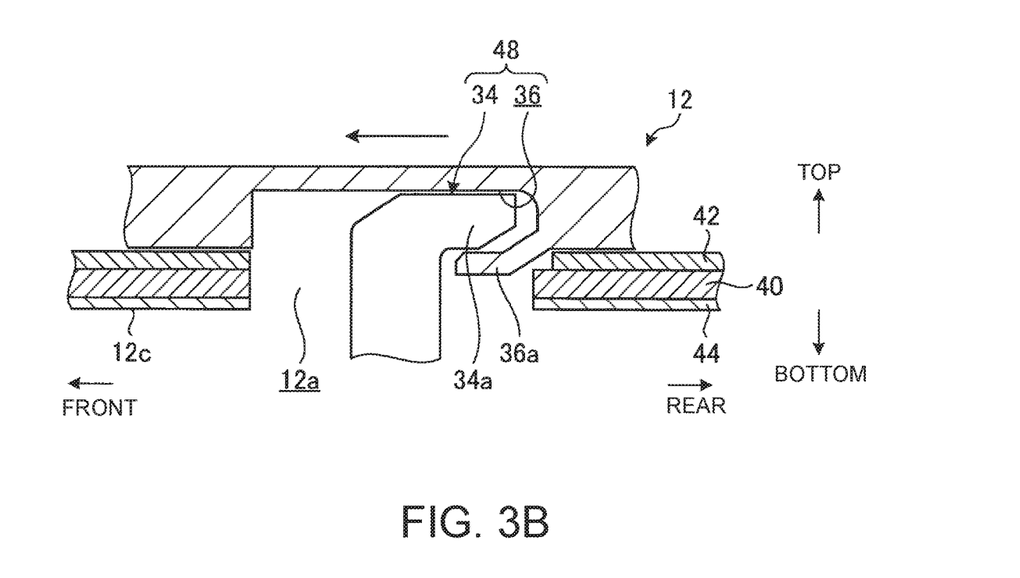
FIG. 3B is a cross-sectional view, showing the hook engaging with the engagement hole shown in FIG. 3A.

FIG. 3A is a cross-sectional view, schematically showing the cross-sectional structure of one of the engagement holes 36 and its surroundings just before attachment of the keyboard unit 12 to the main body chassis 14. FIG. 3B is a cross-sectional view, showing the hook 34 engaging with the engagement hole 36 shown in FIG. 3A.

As shown in FIGS. 3A and 3B, the keyboard unit 12 includes a base plate 40, a membrane sheet 42 and a backlight sheet 44.

The base plate 40 is a plate to attach the keys 28. The base plate 40 is a metal plate member, such as a stainless steel plate or an aluminum plate, having a thickness of 0.3 mm, for example, to which processing, such as cutting and raising or punching, is performed. The keys 28 are supported so that their keytops are vertically movable on the upper face of the base plate 40 using a guide mechanism or a rubber dome, which are not illustrated. The guide mechanism may be a pantograph mechanism to couple the lower face of the keytops and the upper face of the base plate 40, for example. The rubber dome may be a dome-shaped member made of an elastic material having flexibility, such as silicone rubber. The rubber dome is disposed between the membrane sheet 42 and the keytops.

The base plate 40 has a button plate 45 at a center of the front part, and the button plate protrudes forward. A housing plate 46 made of resin is mounted on the upper face of the button plate 45. Button plate 45 and housing plate 46 make up a button supporting part 47 to support the push buttons 23 to 25. The button supporting part 47 is stored and disposed in the button storage recess 30c of the main body chassis 14.

The membrane sheet 42 is stacked on the upper face of the base plate 40. The membrane sheet 42 is a switch sheet having a three-layered structure configured to close a contact when the membrane sheet is pressed. For instance, when the membrane sheet 42 is pressed so that its fixed contact and movable contact are overlapped, the contact of the membrane sheet is closed because the fixed contact and the movable contact are brought into a close contact. The membrane sheet 42 may be stacked on the lower face of the base plate 40. The rubber dome as seated above presses the membrane sheet 42 when the user presses the keys 28 down, and returns the keys 28 to their original positions when the pressing-down operation of the keys 28 is released.

The backlight sheet 44 is stacked on the lower face of the base plate 40. The backlight sheet 44 includes an optical guide plate, for example, made of translucent resin, such as PET, polycarbonate, or acrylic, and includes a light source, such as a LED device, at a center of the left and right ends of the optical guide plate or a left or right end of the optical guide plate. The backlight sheet 44 guides light emitted from the light source in the left-right direction and reflects the light at the reflecting face to irradiate the keytops of the keys 28 with the light from their back faces. Instead of the backlight sheet 44, a waterproof sheet made of rubber or resin may be used.

The frame 29 has a plurality of engagement holes 36 at appropriate positions of the lower face. The frame 29 is fixed to the base plate 40 via an engagement structure including through holes bored at appropriate positions of the membrane sheet 42 or via a screw structure. Into each engagement hole 36, the corresponding hook 34 can be inserted, and the engagement hole has a shape so that the hook 34 can move in the engagement direction (rearward). The engagement hole 36 has a plate-like engagement part 36a at its rear part in the engagement direction with the hook 34, and this engagement part engages with a claw 34a of the hook 34. The hook 34 protrudes upward from the bottom face 30b of the storage recess 30a, and its claw 34a protrudes rearward. These hooks 34 and engagement holes 36 make up a hook mechanism 48 to couple the keyboard unit 12 with the main body chassis 14. The hook mechanism 48 may include the hooks 34 at the keyboard unit 12 and the engagement holes 36 at the main body chassis 14.

The keyboard unit 12 has through holes 12a at the positions below the engagement holes 36 so as to overlap with the engagement holes, and the hooks 34 can be inserted into the through holes 12a. Each through hole 12a penetrates through the membrane sheet 42, the base plate 40, and the backlight sheet 44 from above to below.

With this configuration, to attach the keyboard unit 12 to the main body chassis 14, the keyboard unit 12 is inclined while keeping the rear part lower than the front part, and pressing the rear end face 12b against the rear inner wall 30e of the storage recess 30a (see FIG. 2A and FIG. 3A). Subsequently, the keyboard unit 12 is placed in the storage recess 30a so that the lower face 12c is mounted on the bottom face 30b of the storage recess 30a. Thereby, the hooks 34 are inserted into the engagement holes 36 through the through holes 12a. Then, the keyboard unit 12 is slid forward in the storage recess 30a, whereby the hooks 34 engage with the engagement holes 36 (see FIG. 3B). As a result, the keyboard unit 12 is fixed to the main body chassis 14, whereby the coupled structure 16 can be configured. In the present embodiment, the engagement holes 36 are formed on the lower face (one face) 12c of the keyboard unit 12, and the hook 34 can be engaged to the engagement holes 36 via the through holes 12a. Instead, the engagement holes 36 may be formed at the base plate 40 itself.

When the keyboard unit 12 engages with the main body chassis 14 only via the hook mechanism 48, impact, if given, may cause displacement of the keyboard unit 12 in the storage recess 30a. To avoid this, the coupling structure 10 has a structure to always bias the keyboard unit 12 in the engagement direction (forward) of the hooks 34 with the engagement holes 36.

Figure 4:
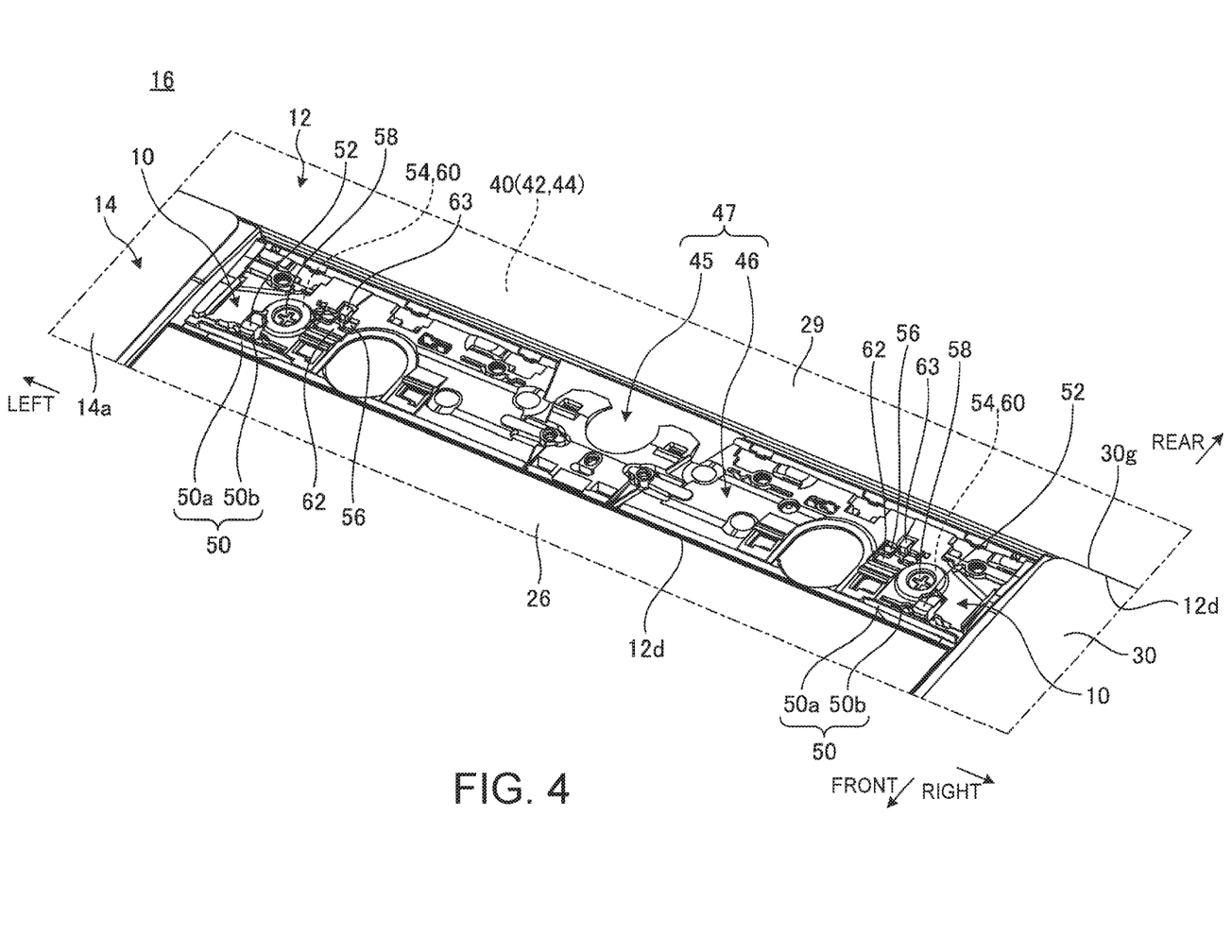
FIG. 4 is an enlarged perspective view of the button supporting part of the coupled structure and its surroundings.
Figure 5A:
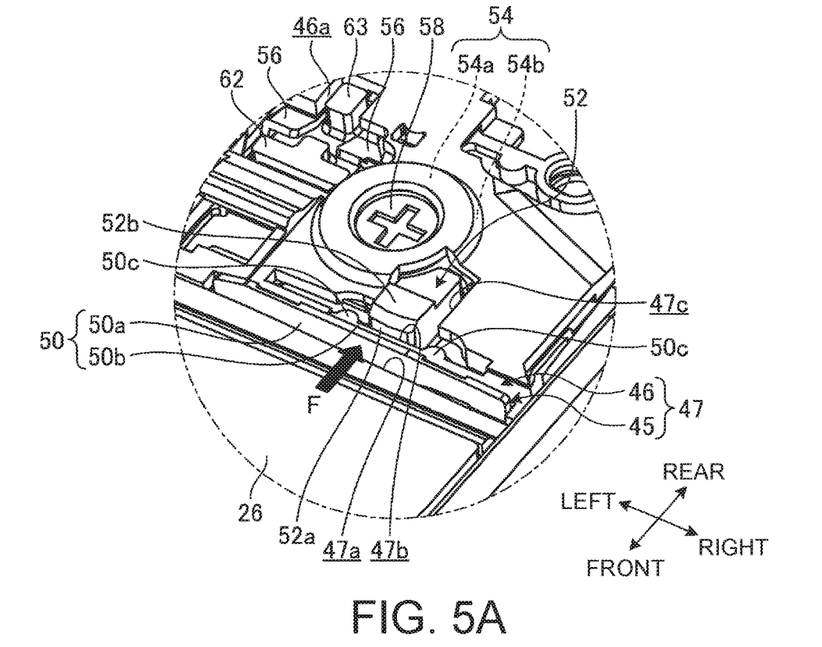
FIG. 5A is an enlarged perspective view of a major part of the button supporting part in FIG. 4.
Figure 5B:
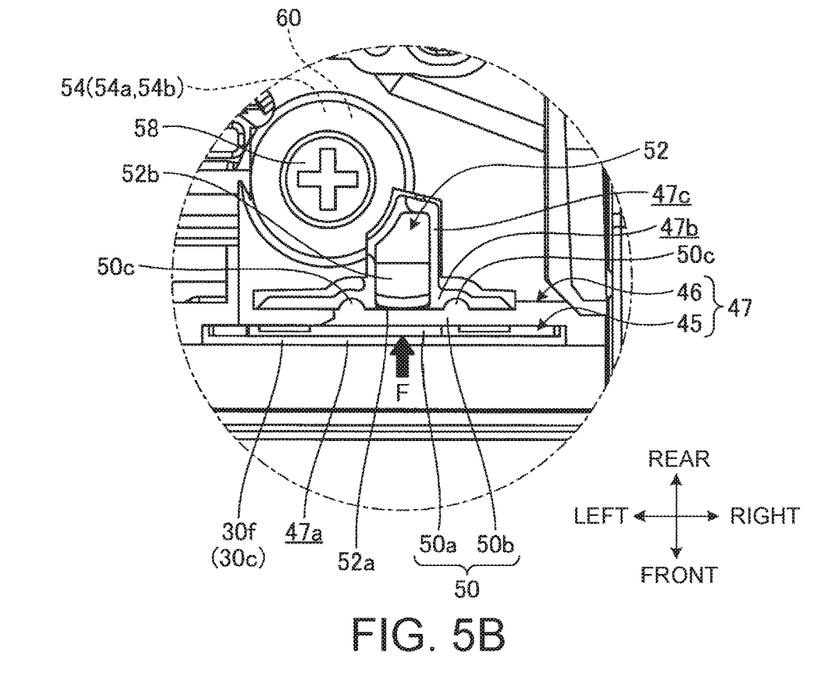
FIG. 5B is a plan view of the button supporting part in FIG. 5A.
Figure 6:
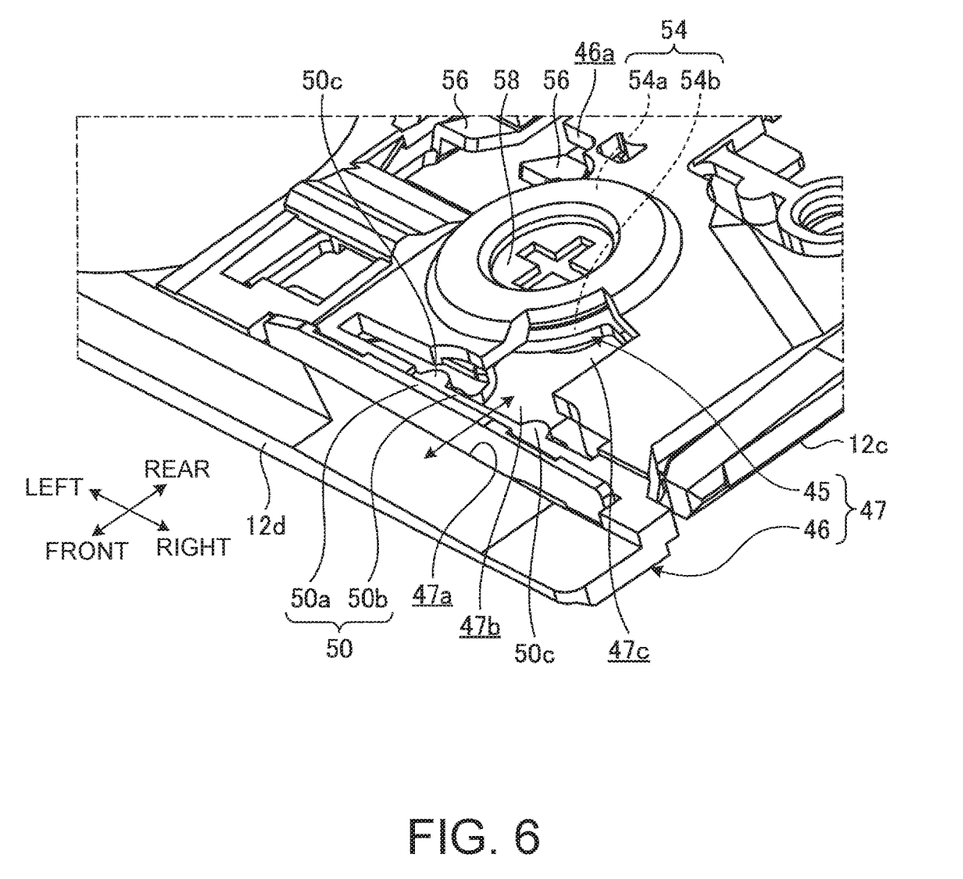
FIG. 6 is an enlarged perspective view of the major part of the button supporting part when the keyboard unit is not attached to the main body chassis.
Figure 7:
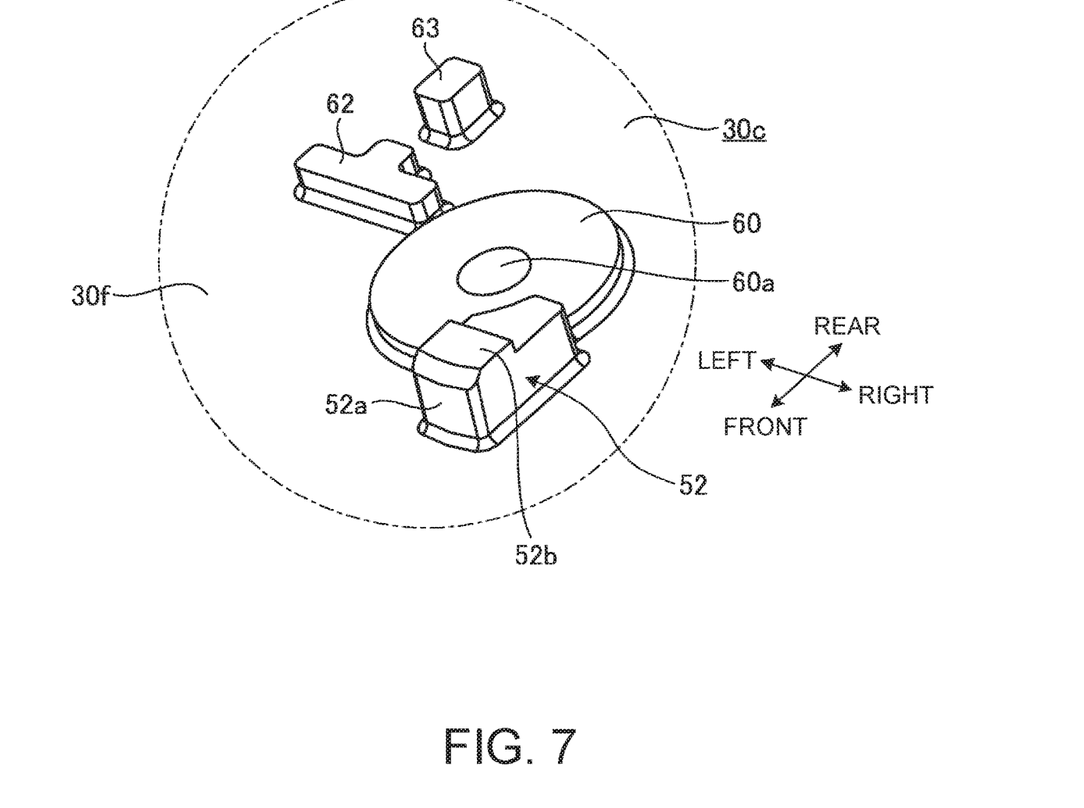
FIG. 7 is an enlarged perspective view of a major part of the button storage recess when the keyboard unit is not attached to the main body chassis.

FIG. 4 is an enlarged perspective view of the button supporting part 47 of the coupled structure 16 and its surroundings. FIG. 5A is an enlarged perspective view of a major part of the button supporting part 47 in FIG. 4. FIG. 5B is a plan view of the button supporting part 47 in FIG. 5A. FIG. 6 is an enlarged perspective view of the major part of the button supporting part 47 when the keyboard unit 12 is not attached to the main body chassis 14. FIG. 7 is an enlarged perspective view of a major part of the button storage recess 30c when the keyboard unit 12 is not attached to the main body chassis 14.

As shown in FIG. 4, the coupling structure 10 of the coupled structure 16 includes elastic parts 50 at the button supporting part 47 and locking parts 52 at the main body chassis 14.

As shown in FIGS. 5A, 5B and 6, the elastic parts 50 are disposed close to the front edge of the button supporting part 47 and close to both left and right ends of the button supporting part 47. Each elastic part 50 has a first plate spring 50a and a second plate spring 50b. The button supporting part 47 has a gap 47a in front of the elastic part 50 and a through hole 47b in the thickness direction behind the elastic part 50.

The first plate spring 50a is a thin-plate part prepared by cutting and raising the metal button plate 45 that is integrally formed with the base plate 40. Specifically, the first plate spring 50a is a thin plate rising vertically so that the thickness is directed in the front-rear direction and extends in the left-right direction. The second plate spring 50b is a thin-plate part formed at the resin housing plate 46. The second plate spring 50b is stacked on the rear face of the first plate spring 50a. Specifically, the second plate spring 50b is a thin plate rising vertically so that the thickness is directed in the front-rear direction and extends in the left-right direction. Configured this way, the first plate spring 50a and second plate spring 50b function as the elastic part 50 like a plate spring that can be deformed integrally and elastically in the front-rear direction.

The gap 47a is defined between the front face of the first plate spring 50a of the elastic part 50 and the front edge of the housing plate 46 disposed in front of the first plate spring. This gap 47a extends along the left-right width direction of the elastic part 50, and is a space to allow forward elastic deformation of the elastic part 50.

The through hole 47b is defined between the rear face of the second plate spring 50b of the elastic part 50 and the housing plate 46 or the base plate 40 disposed behind the second plate spring. This through hole 47b extends along the left-right width direction of the elastic part 50 and has a recess 47c dented rearward at a center part, and so is a hole having a substantially T-letter shape in a plan view (see FIG. 5B).

As shown in FIGS. 5A, 5B and 7, the locking part 52 is a protrusion like a block that protrudes upward from the bottom face 30f of the button storage recess 30c at the main body chassis 14. This locking part 52 is inserted into the recess 47c of the through hole 47b when the button supporting part 47 is stored in the button storage recess 30c. At this time, a locking face 52a as the front face of the locking part 52 locks the rear face of the elastic part 50 (the second plate spring 50b). The locking face 52a is an inclined face that is inclined forward gradually in the direction of mounting the keyboard unit 12 to the main body chassis 14 (downward). The inclination angle of the locking face 52a is set at from the vertical direction to 5 degrees, for example. In the present embodiment, the second plate spring 50b has a pair of left and right protrusions 50c, 50c at the rear face. This pair of protrusions 50c, 50c sandwiches the locking part 52 therebetween, and functions to position the locking part 52 relative to elastic part 50 or prevent the displacement of them.

As shown in FIGS. 5A, 5B and 6, the button supporting part 47 further includes a ring-shaped recess 54 that is an opening at the lower face 12c and tool-receiving pieces 56 prepared by cutting and raising the button plate 45. Similarly to the elastic part 50 and the locking part 52, there is a pair of left and right recesses 54 and tool-receiving pieces 56 at the button supporting part 47.

Each recess 54 includes a ring-shaped first recess 54a that is formed at the lower face of the housing plate 46 so as to bulge upward, and a ring-shaped second recess 54b that is formed at the lower face of the button plate 45 so as to bulge upward, and the second recess is overlapped on the first recess from the lower side. With this configuration, the second recess 54b is open at the lower face 12c of the button supporting part 47. At the center of the recess 54, a through hole 54c is formed for insertion of a screw 58 (see FIG. 8A). The tool-receiving pieces 56 are prepared by cutting and raising the button plate 45 at the lower layer of the button supporting part 47 so as to rise diagonally forward. A pair of the left and right tool-receiving pieces 56 is formed, and faces the opening 46a of the housing plate 46 at the upper face.

As shown in FIGS. 5A, 5B and 7, the bottom face 30f of the button storage recess 30c further includes a ring-shaped projection 60, a tool-receiving base 62, and a tool-locking base 63. Similarly to the elastic part 50 and the locking part 52, there is a pair of left and right projections 60, tool-receiving bases 62 and tool-locking bases 63 at the button supporting part 47.

Each projection 60 has a truncated conical shape so as to bulge upward from the bottom face 30f, and has a screw hole (hole) 60a at the center for fastening of the screw 58. This projection 60 fits the recess 54 from below when the button supporting part 47 is stored in the button storage recess 30c. The tool-receiving base 62 is a triangular projection that protrudes upward from the bottom face 30f, and the vertex of the triangle is directed rearward. The tool-locking base 63 is a rectangular projection that protrudes upward from the bottom face 30f, and is opposed to the vertex of the triangle of the tool-receiving base 62. These tool-receiving base 62 and tool-locking base 63 are inserted into the opening 46a of the housing plate 46 when the button supporting part 47 is stored in the button storage recess 30c. At this time, the tool-receiving base 62 is opposed to the tool-receiving piece 56, and the tool-locking base 63 is disposed between the left and right tool-receiving pieces 56, 56.

Next the following describes how to attach the keyboard unit 12 to the main body chassis 14 via the coupling structure 10 as stated above.

Figure 8A:
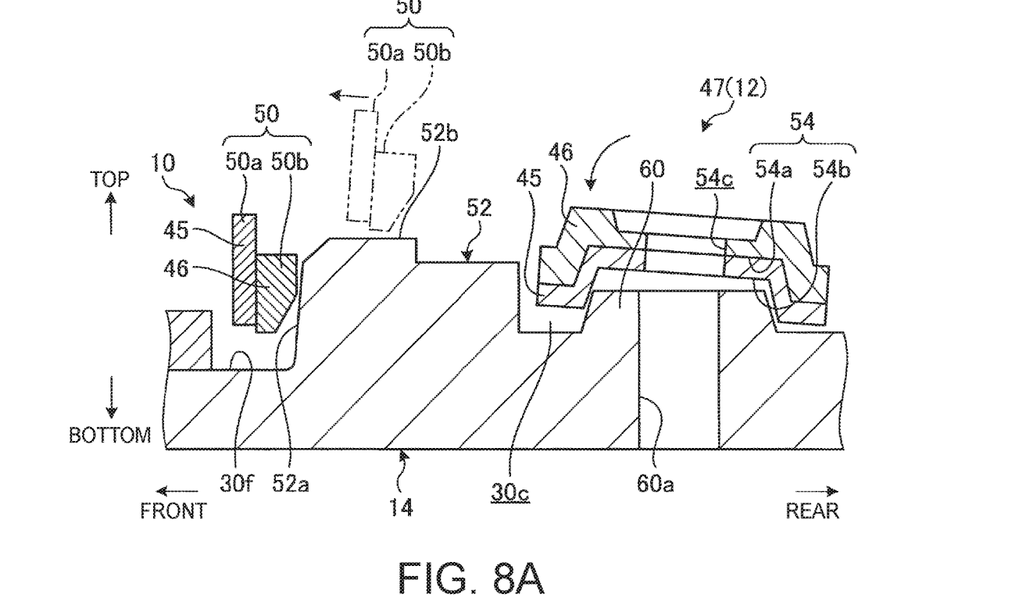
FIG. 8A is a cross-sectional view, schematically showing the coupling structure just before attachment of the keyboard unit to the main body chassis.
Figure 8B:
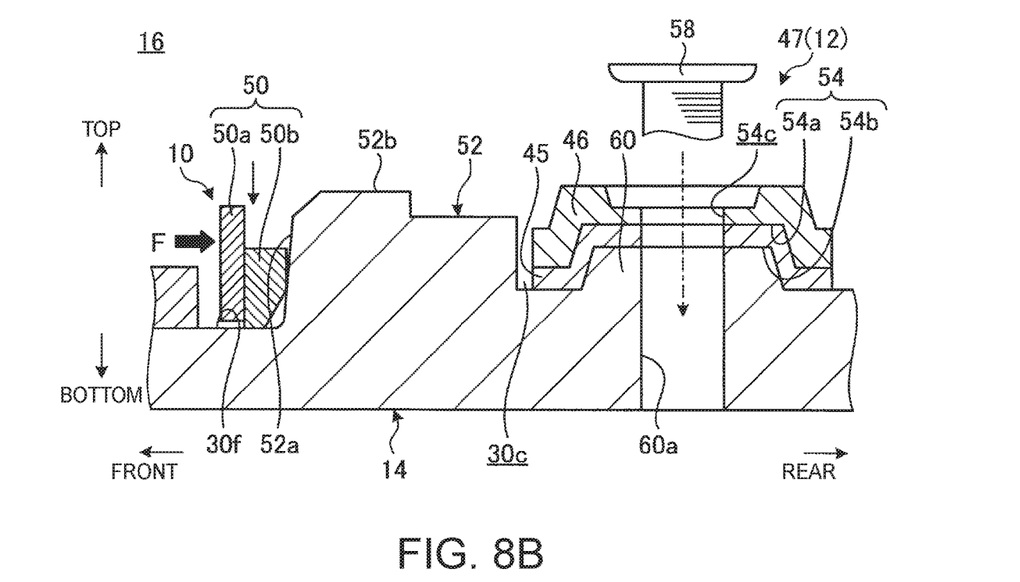
FIG. 8B is a cross-sectional view, schematically showing the coupling structure after attachment of the keyboard unit to the main body chassis from the state of FIG. 8A.

FIG. 8A is a cross-sectional view, schematically showing the coupling structure 10 just before attachment of the keyboard unit 12 to the main body chassis 14. FIG. 8B is a cross-sectional view, schematically showing the coupling structure 10 after attachment of the keyboard unit 12 to the main body chassis 14 from the state of FIG. 8A. FIGS. 8A and 8B are schematic views collectively showing the cross-sectional view of the locking part 52 taken along a line in the front-rear direction, and the cross-sectional view of the center of the recess 54 taken along a line in the front-rear direction.

To attach the keyboard unit 12 to the main body chassis 14, the keyboard unit 12 is firstly inclined while keeping the rear part lower than the front part, and pressing the rear end face 12b against the rear inner wall 30e of the storage recess 30a (see FIG. 2A and FIG. 3A) as stated above. Subsequently, the front end of the keyboard unit 12 is lowered so that the lower face 12c is mounted on the bottom face 30b, so that the keyboard unit 12 is placed in the storage recess 30a.

In this state, as indicated with dashed-two dotted line in FIG. 8A, the elastic part 50 is mounted on the upper face 52*b* of the locking part 52. Then, the keyboard unit 12 is slid forward in the storage recess 30*a*, whereby the hooks 34 engage with the engagement holes 36 (see FIG. 3B). At this time, as indicated with the solid line in FIG. 8A, the elastic part 50 slides along the upper face 52*b* until a part thereof is locked at the locking face 52*a*. At the same time, the recess 54 overlies the projection 60. Note here that the upper face 52*b* of the locking part 52 has to have a length along the front-end direction (e.g., about 3 mm) that is at least longer than the engagement length of the hook 34 with the engagement hole 36 (e.g., about 2.3 mm). This prevents a failure that the elastic part 50 cannot be mounted on the upper face 52*b* of the locking part 52 and is caught at the rear part thereof, unlike the state of the elastic part 50 indicated with the dashed-two dotted line in FIG. 8A.

Next, the screw 58 is passed through the through hole 54*c* of the recess 54 from the above to be threadably mounted on the screw hole 60*a* of the main body chassis 14, so as to fasten the keyboard unit 12 to the main body chassis 14 (see FIG. 8B). Then, the fastening force of the screw 58 brings the keyboard unit 12 toward the main body chassis 14 while letting the elastic part 50 slide along the locking face 52*a* until the elastic part is completely locked at the locking face 52*a* (see FIG. 8B). As a result, the elastic part 50 always biases the keyboard unit 12 in the engagement direction (forward) of the hooks 34 with the engagement holes 36 relative to the main body chassis 14 by the elastic force F. At the same time, the projection 60 of the main body chassis 14 fits into the recess 54 of the keyboard unit 12, whereby the keyboard unit 12 is positioned and fixed relative to the main body chassis 14.

As stated above, this coupled structure 16 includes the hook mechanism 48 to enable the movement of the keyboard unit 12 relative to the main body chassis 14 in one direction (forward) for engagement, the locking part 52 formed at the main body chassis 14, and the elastic part 50 formed at the keyboard unit 12, and the elastic part is locked at the locking part 52 when the keyboard unit 12 is coupled with the main body chassis 14, and so generates a biasing force in the direction of moving the keyboard unit 12 forward relative to the main body chassis 14.

In this way, this coupled structure 16 is configured so that the locking part 52 locks the elastic part 50, and so the keyboard unit 12 always receives a biasing force in the engagement direction (forward) of the hook mechanism 48. This can prevent the displacement of the keyboard unit 12 relative to the main body chassis 14 during the manufacturing and the operation, and so prevent the cancelling of the engagement state of the hook mechanism 48, and can keep them in a coupled state. Additionally, the keyboard unit 12 is always biased forward relative to the main body chassis 14, and so a minimum gap is defined at the rear end between the keyboard unit 12 and the main body chassis 14, the gap corresponding to the engagement length of the hook mechanism 48. This gap does not change over time, and a gap at the front end can be kept at substantially zero. The coupled structure 16 therefore can suppress the deterioration in appearance as low as possible. Especially when viewed from a user of the electronic device 18 including such a coupled structure 16, such a gap between the front end face 12*d* of the keyboard unit 12 closer to the viewer and the front inner wall 30*g* of the storage recess 30*a* is conspicuous for the user. Since the coupled structure 16 can reduce this gap, this coupled structure can improve the appearance of the electronic device 18.

The present embodiment shows the configuration of the button supporting part 47 that protrudes at the front end face 12*d* of the keyboard unit 12. When the keyboard unit 12 does not have such a button supporting part 47, the elastic part 50 may be provided close to the front end face 12*d*. Note here that the elastic part 50 is preferably formed close to the front end face 12*d* of the keyboard unit 12. The keyboard unit 12 has a certain dimensional tolerance in the front-rear direction, or may be elongated in such a direction. Therefore, if the elastic part 50 is provided close to the rear end face 12*b* that is the rearmost end in the engagement direction of the hook mechanism 48, it becomes difficult for the elastic part 50 to receive the biasing force reliably because of such a dimensional tolerance and elongation, and so this may fail to eliminate a gap between the front end face 12*d* of the keyboard unit 12 and the front inner wall 30*g* of the storage recess 30*a*. Of course, if the length of the keyboard unit 12 in the front-rear direction is small or depending on the rigidity of the keyboard unit, the elastic part 50 may be provided close to the rear end face 12*b* or at a center in the front-rear direction.

The elastic part 50 includes the resin second plate spring 50*b* on the rear face of the metal first plate spring 50*a*, and this second plate spring 50*b* comes in contact with the locking part 52. Such a metal first plate spring 50*a* can improve the elasticity and the strength of the elastic part 50. Additionally, the resin second plate spring 50*b* comes in contact with the resin locking part 52 of the resin main body chassis 14. This can suppress breakage or wearing of the locking part 52, which might occur if the locking part collides with the metal first plate spring 50*a*, and can reduce impact noise generated at the contacting part between the elastic part 50 and the locking part 52. The elastic part 50 may include any one of the resin second plate spring 50*b* and the metal first plate spring 50*a*.

The locking face 52*a* of the locking part 52 has an inclined face that is inclined gradually in the engagement direction (forward) of the hook mechanism 48 toward the downward direction that is the direction of mounting the keyboard unit 12 on the main body chassis 14. Therefore, when the user engages the hook mechanism 48 and concurrently presses the keyboard unit 12 against the main body chassis 14, such an operation allows the elastic part 50 of this coupled structure 16 to be deformed elastically and be locked at the locking face 52*a* of the locking part 52 without a gap. This can prevent a gap between the elastic part 50 and the locking part 52, and can generate a biasing force from the elastic part 50 to the keyboard unit 12 reliably.

Such a coupled structure 16 has the screw 58 to fasten the keyboard unit 12 to the main body chassis 14. This can make the coupling state between the keyboard unit 12 and the main body chassis 14 more stable due to the fastening action by the screw 58 in addition to the engagement action of the hook mechanism 48. In the embodiments shown, this screw 58 is fastened in the direction of the mounting of the lower face 12*c* of the keyboard unit 12 on the bottom face 30*f* of the main body chassis 14. This means that the fastening of the screw 58 enables deeper engagement of the elastic part 50 with the locking face 52*a* of the locking part 52, and so can generate a biasing force from the elastic part 50 to the keyboard unit 12 more reliably. During the manufacturing of this coupled structure 16, after engagement of the hook mechanism 48, the posture of the coupled structure 16 may have to be changed before fastening with the screw 58. In this respect, since this coupled structure 16 can temporarily fix the elastic part 50 that is locked at the locking part 52 after the engagement of the hook mechanism 48, this can suppress the displacement of the keyboard unit 12 during such an operation to change the posture. Note here that in the case of the coupled structure 16, since the screw 58 can be fastened along the direction of mounting the keyboard unit 12 on the main body chassis 14, such an operation to change the posture is substantially unnecessary, and the electronic device can be manufactured efficiently. Needless to say, depending on the specifications of the electronic device 18 that includes such a coupled structure 16, the screw 58 may be fastened from the below.

The coupled structure 16 of the present embodiment is configured so that the locking part 52 locks the elastic part 50, and so the keyboard unit 12 is always biased in the engagement direction of the hook mechanism 48. This can suppress a relative movement between the keyboard unit 12 and the main body chassis 14 in the direction to cancel the engagement of the hook mechanism 48, without a need of the screw 58. When the configuration does not have a screw 58, the arrangement of the locking part 52 and the inclination angle of the locking face 58a may be designed appropriately so that the locking part 52 completely locks the elastic part 50 after the engagement of the hook mechanism 48.

The coupled structure 16 is configured so that the lower face 12c of the keyboard unit 12 has the recess 54 having the hole 54c at the center for insertion of the screw 58, and the bottom face 30f of the main body chassis 14 has the screw hole 60a at the center for insertion of the screw 58 and has the projection 60 to be fitted to the recess 54. This configuration can prevent the displacement of the keyboard unit 12 with the main body chassis 14 due to the fitting of the recess 54 and the projection 60 even when the screw 58 is loosened due to a change over time or impact, for example. Such a fitting structure of the recess 54 to the projection 60 may include the hook mechanism 48 only, and may not have the screw 58.

Such a coupling structure 10 between the keyboard unit 12 and the main body chassis 14 holds the engagement state of the hooks 34 with the engagement holes 36 at the hook mechanism 48 due to the elastic locking structure of the elastic part 50 with the locking part 52. This means that a certain operation is required to remove the keyboard unit 12 from the main body chassis 14 for maintenance, for example. To this end, the coupling structure 10 has a structure of facilitating the disassembly of the keyboard unit 12 from the main body chassis 14.

Figure 9A:
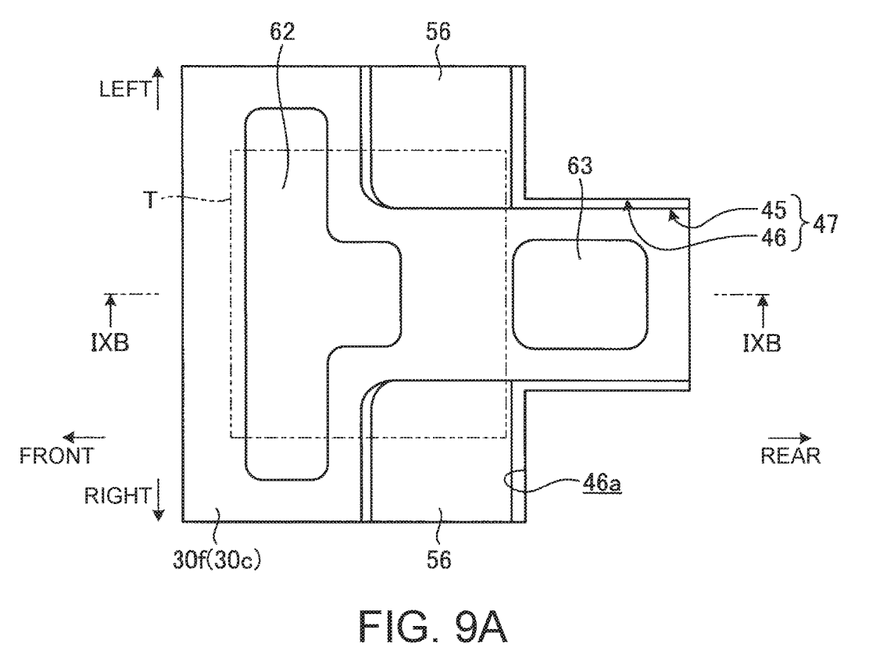
Figure 9B:
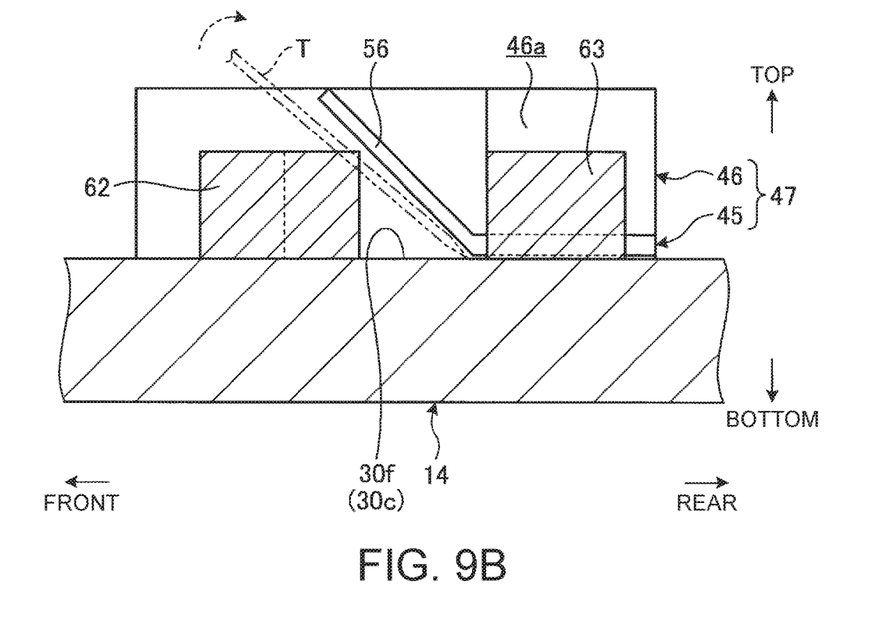
FIG. 9B is a cross-sectional view taken along the line IXB-IXB in FIG. 9A.

FIG. 9A is a schematic plan view to describe how to use the tool-receiving pieces 56, the tool-receiving base 62 and the tool-locking base 63 to remove the keyboard unit 12 from the main body chassis 14. FIG. 9B is a cross-sectional view taken along the line IXB-IXB in FIG. 9A.

To remove the keyboard unit 12 from the main body chassis 14, firstly the push buttons 23 to 25 are removed from the button supporting part 47, and then the screw 58 is unfastened. Then as shown in FIGS. 9A and 9B, the tool-receiving pieces 56, the tool-receiving base 62 and the tool-locking base 63 are exposed at the upper face of the button supporting part 47. Then, a thin-plate like tool T, such as a wide flathead screwdriver, is inserted between the tool-receiving base 62 and the tool-receiving pieces 56 so as to press the tip end of the tool T against the corner between the bottom face 30f of the button storage recess 30c and the tool-locking base 63. Then, as indicated with the dashed-two dotted line in FIG. 8B, the tool T is rotated rearward by supporting the tool T at the tip end coming in contact with the corner between the bottom face 30f and the tool-locking base 63. As a result, the tool T presses the tool-receiving piece 56 rearward and upward due to the principle of leverage, and so this can move the keyboard unit 12 easily rearward and upward. As a result, the elastic part 50 is removed upward from the locking face 52a of the locking part 52, so that the hooks 34 are disengaged from the engagement holes 36. Then, the user can remove the keyboard unit 12 from the main body chassis 14 easily.

The present invention is not limited to the above-described embodiments, and can be modified freely without deviating from the scope of the present invention.

In the above embodiment, the keyboard unit 12 and the main body chassis 14 are shown as one example of the two members to be coupled with the coupling structure 10, and the coupling structure 10 may be used for coupling of other members. For instance, the upper cover 30 and the lower cover 32 of the main body chassis 14 of the electronic device 18 may be coupled with the coupling structure, or other electronic components in the main body chassis 14 may be fixed with the coupling structure. This coupled structure 16 may be used for an electronic device other than a laptop PC, a mechanical chassis other than electronic devices, or mechanical devices.

What is claimed is:

1. A coupled structure including a first member coupled to a second member, comprising:
   a hook mechanism configured to engage the first member with the second member when the first member moves in one direction relative to the second member;
   a locking part at the second member; and
   an elastic part at the first member, the elastic part configured to bias the first member engaged with the second member in the one direction relative to the second member when the locking part locks the elastic part.

2. The coupled structure according to claim 1, wherein
   the hook mechanism includes an engagement hole at one face of the first member and a hook at one face of the second member or a hook at the one face of the first member and an engagement hole at the one face of the second member,
   the hook mechanism configured to, after placing the one face of the first member on the one face of the second member and inserting the hook into the engagement hole, and moving the first member in the one direction relative to the second member, engage with the engagement hole,
   the elastic member is disposed at the one face of the first member, and
   the locking part is disposed at the one face of the second member, and has a locking face configured to lock the elastic part in the one direction.

3. The coupled structure according to claim 2, wherein
   the locking face has an inclined face that is inclined gradually in the one direction and toward a direction of placing the one face of the first member on the one face of the second member.

4. The coupled structure according to claim 3, further comprising:
   a screw that fastens the first member to the second member in the direction of placing the one face of the first member on the one face of the second member.

5. The coupled structure according to claim 4, wherein
   the one face of the first member has a recess having a first hole at a center, the first hole configured for insertion of the screw, and the one face of the second member has a second hole at a center, the second hole configured for insertion of the screw, and has a projection configured to fit the recess of the first member.

6. The coupled structure according to claim 2, wherein the locking part extends in the one direction and has an upper face continuous to the locking face, and
the upper face of the locking part has a length in the one direction that is longer than an engagement length of the hook with the engagement hole.

7. An electronic device, comprising:
a coupled structure including a first member coupled to a second member, comprising:
  a hook mechanism configured to engage the first member with the second member when the first member moves in one direction relative to the second member;
  a locking part at the second member; and
  an elastic part at the first member, the elastic part configured to bias the first member engaged with the second member in the one direction relative to the second member when the locking part locks the elastic part; wherein
the first member is a keyboard unit, and
the second member is a chassis having an upper face on which the keyboard unit is mounted.

8. The electronic device according to claim 7, wherein the one direction is a direction toward an end of the keyboard unit that is closer to a user of the electronic device.

9. The electronic device according to claim 8, wherein the elastic part is disposed at a position close to the end of the keyboard unit that is closer to the user.

10. The electronic device according to claim 7, wherein the keyboard unit includes a metal base plate and a resin housing plate stacked on an upper face of the base plate,
the elastic part includes a first plate spring disposed at the base plate and a second plate spring disposed at the housing plate, the second plate spring being overlapped on the first plate spring, and
the second plate spring comes in contact with the locking part.

* * * * *